United States Patent
Coxhead et al.

(10) Patent No.: US 6,827,548 B2
(45) Date of Patent: Dec. 7, 2004

(54) ROTOR ASSEMBLIES FOR GAS TURBINE ENGINES

(75) Inventors: Todd M Coxhead, Derby (GB); James M Townsend, Ashbourne (GB); Kenneth F Udall, Derby (GB)

(73) Assignee: Rolls-Royce plc, London (GB)

( * ) Notice: Subject to any disclaimer, the term of this patent is extended or adjusted under 35 U.S.C. 154(b) by 35 days.

(21) Appl. No.: 10/309,282

(22) Filed: Dec. 4, 2002

(65) Prior Publication Data

US 2003/0143063 A1 Jul. 31, 2003

(30) Foreign Application Priority Data

Dec. 19, 2001 (GB) .............................................. 0130295

(51) Int. Cl.[7] .............................................. F01B 31/36
(52) U.S. Cl. .......................................... 415/9; 417/319
(58) Field of Search ...................... 415/9, 122.1, 124.1; 416/9, 2; 417/319

(56) References Cited

U.S. PATENT DOCUMENTS 4,452,567 A   6/1984   Treby

FOREIGN PATENT DOCUMENTS

| GB | 700768 | P | 12/1953 |
| GB | 802264 | P | 10/1958 |
| GB | 1459532 | P | 12/1976 |
| GB | 2111639 | A | 7/1983 |

*Primary Examiner*—Edward K. Look
*Assistant Examiner*—Dwayne White
(74) *Attorney, Agent, or Firm*—W. Warren Taltavull; Manelli, Denison & Selter PLLC

(57) ABSTRACT

A gas turbine engine 10 includes an intermediate pressure compressor 14 connected to an intermediate pressure turbine 22 by a driveshaft 28. The driveshaft 28 comprises a downstream turbine shaft 34 attached to the intermediate pressure turbine 22 and an upstream compressor shaft 32 attached to the intermediate pressure compressor 14. The compressor shaft 32 and turbine shaft 34 are connected together by a splined connection 36 which allows the turbine shaft 34 to drive the compressor shaft 32. If the splined connected 36 should fail, so that it no longer transmits torque, a further splined connection 41 comes into operation to transmit torque between the turbine shaft 34 and compressor shaft 32. When this happens, torque is transmitted via a torsionally weakened, shear section 48 of the turbine shaft 34 which tends to break under certain engine conditions. The turbine shaft 34 is then released axially and turbine overspeed is restrained.

10 Claims, 2 Drawing Sheets

ROTOR ASSEMBLIES FOR GAS TURBINE ENGINES

FIELD OF THE INVENTION

The present invention relates to rotor assemblies for gas turbine engines.

BACKGROUND OF THE INVENTION

Gas turbine engines include one or more turbines driven by combustion gases, each turbine in turn driving a fan or a compressor via an interconnecting shaft. A "triple spool" engine includes a low pressure (LP) turbine which drives a single stage fan, an intermediate pressure (IP) turbine which drives an intermediate compressor and a high pressure (HP) turbine which drives a high pressure compressor. Each turbine drives its respective compressor/fan via an interconnecting shaft which may comprise an upstream compressor shaft and a downstream turbine shaft coupled together to allow the transmission of torque therebetween. The engine utilizes thrust bearing structures or other axial location structures which are positioned intermediate the ends of the shafts, for the purpose of locating the shafts against undesirable axial movement.

Gas turbine engines are commonly used as the propulsion units for aircraft. In the event of an engine breakdown during operation, any damage which results from the breakdown must be minimised so as not to jeopardise the flight capability of the aircraft.

If one of the shafts connecting the turbines and compressors breaks and the flow of combustion gases is not stayed, the turbine may rapidly overspeed because it is no longer driving its associated compressor/fan. The turbine may speed up sufficiently that there is a risk of it throwing off its blades or of its disc bursting and causing significant damage.

If the shaft fails downstream of its axial location structure, the pressures within the engine force the turbine downstream and the turbine blades therefore tangle with a fixed structure such as the outlet guide vanes or exhaust bullet struts. Therefore the rotational energy of the turbine is absorbed in friction and plastic work, and the turbine overspeed is restrained.

More damaging is if the fan shaft fails upstream of the axial location structure. In this case, the thrust bearing structure prevents axial movement of the downstream portion of the shaft and prevents tangling. The turbine therefore continues to speed up and complete blades or parts of discs may be thrown off in the radial direction. This also happens if the coupling for transmitting torque from the turbine shaft to the compressor shaft fails, but the shaft does not break. In this case, because the shaft has not broken, it does not move downstream. However, torque is no longer transmitted and therefore the turbine may overspeed. It is this particular failure that this invention addresses.

SUMMARY OF THE INVENTION

According to the invention, there is provided a rotor assembly for a gas turbine engine, the rotor assembly including: a compressor, a turbine and connection means for drivingly connecting the compressor and the turbine for rotation at a common speed, the connection means including an upstream compressor shaft and a downstream turbine shaft coupled together to allow the transmission of torque therebetween, the coupling means including first torque transmission means for transmitting torque between the turbine shaft and the compressor shaft in normal operation; characterised in that the coupling means further includes second torque transmission means for transmitting torque between the turbine shaft and the compressor shaft on failure of the first torque transmission means, transmission of torque via the second torque transmission means causing the turbine shaft to break under certain engine conditions.

The terms "upstream" and "downstream" are intended to refer to the normal direction of movement of gases through the turbine engine.

Preferably the first torque transmission means includes a splined connection, failure of the torque transmission means being caused by the splines no longer transmitting torque between the turbine shaft and the compressor shaft. Preferably the splines are substantially helical, so that the transmission of torque urges the turbine and compressor shafts towards one another in the axial direction.

Preferably the second torque transmission means includes a toothed connection between the turbine shaft and the compressor shaft, the teeth on the respective shafts being spaced apart in normal operation but being brought into engagement with one another on relative movement of the turbine shaft and compressor shaft, the teeth when in engagement allowing the transmission of torque between the respective shafts via the teeth. The toothed connection may comprise splines on one of the shafts and complementary grooves on the other of the shafts.

The relative rotation of the two shafts would normally be caused by the failure of the splined connection comprising the first torque transmission means.

Preferably the turbine shaft includes a relatively torsionally weak region, the turbine shaft tending to break in this region when it drives the compressor shaft via the second torque transmission means. The torsionally weak region is preferably located upstream at the first torque transmission means. Most preferably the torsionally weak region is located between the first and second torque transmission means. Preferably the turbine shaft is normally prevented from moving downstream by first torque transmission means, backed up by axial location means upstream of the torsionally weak region.

According to the invention there is further provided a gas turbine engine including a rotor assembly according to any of the preceding definitions.

An embodiment of the invention will be described for the purpose of illustration only with reference to the accompanying drawings in which:

DETAILED DESCRIPTION OF THE INVENTION

Figure 1:
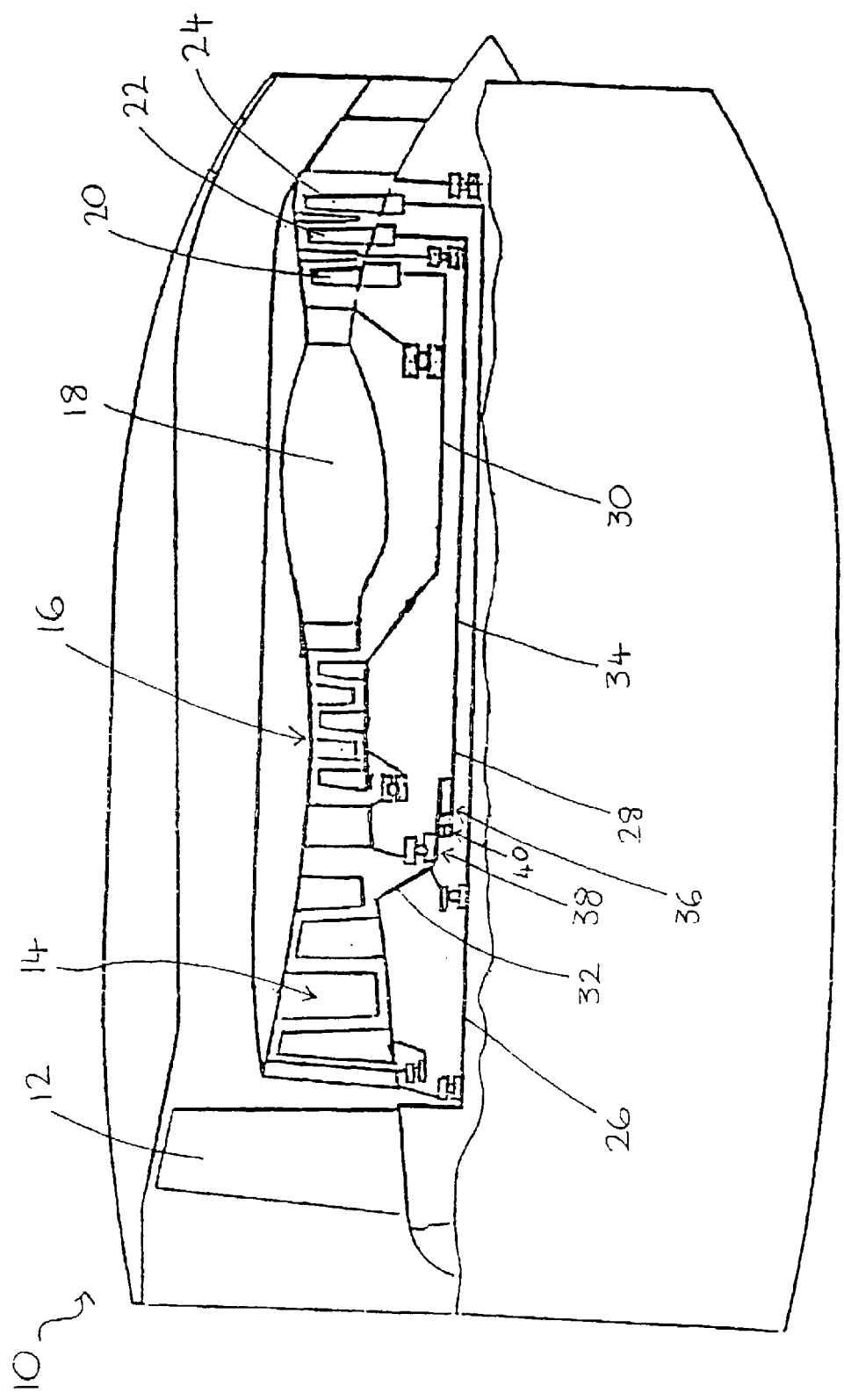
FIG. 1 is a diagrammatic view of a known ducted fan gas turbine engine.

Referring to FIG. 1, a ducted fan gas turbine engine generally indicated at 10 includes, in axial flow series, a fan 12, an intermediate pressure compressor 14, a high pressure compressor 16, a combustion chamber 18, high pressure turbine stages 20, intermediate pressure turbine stages 22 and low pressure turbine stages 24.

The fan 12 is connected to the low pressure turbine stage 24 by an interconnecting drive shaft 26 which allows for the transmission of rotary drive torque from the turbine stage 24 to the fan 12. Similar intermediate pressure and high pressure drive shafts 28 and 30 connect the intermediate and high pressure compressors 14 and 16 with the intermediate and high pressure turbines 22 and 20 respectively.

The gas turbine engine 10 works in the conventional manner so that air entering an air intake is accelerated by the fan 12 to produce two airflows, a first airflow to the intermediate pressure compressor 14 and a second airflow which provides propulsive thrust. The intermediate pressure compressor 14 compresses the airflow directed into it before delivering the air to the high pressure compressor 16 where further compression takes place.

The compressed air exhausted from the high pressure compressor 16 is directed into the combustion equipment 18 where it is mixed with fuel and the mixture combusted. The resultant hot combustion products then expand through and thereby drive the high, intermediate and low pressure turbines 20, 22 and 24 before being exhausted through an exhaust nozzle to provide additional propulsive thrust. The high, intermediate and low pressure turbines 20, 22 and 24 respectively drive the high and intermediate pressure compressors 16 and 14 and the fan 12 by the interconnecting shafts mentioned previously.

The intermediate pressure drive shaft 28 consists of an upstream compressor shaft 32 which is attached to the intermediate pressure compressor 14, and a downstream turbine shaft 34 which is attached to the intermediate pressure turbine 22. The compressor shaft 32 and the turbine shaft 34 are connected together in driving engagement by torque transmission means in the form of a splined connection 36. The splined connection 36 comprises a helical winding which causes the two shafts to pull together as the turbine shaft 34 drives the compressor shaft 32. The shafts are held against axial movement by a thrust bearing arrangement 38 and a coupling device 40 which prevents the turbine shaft 34 moving downstream relative to the compressor shaft 32.

If the splined connection 36 should fail such that it is no longer able to transmit torque from the turbine shaft 34 to the compressor shaft 32, the intermediate pressure turbine 22 speeds up dramatically. This may cause its blades or sectors of its disc to be thrown off in a radial direction, thus seriously damaging the engine. As this happens, there is a backwardly directed force on the intermediate pressure turbine. However, since the turbine shaft 34 has not actually broken, it is still held axially and is not able to move in the downstream direction. If the intermediate pressure turbine could move in a downstream direction, it would foul against a fixed structure such as intermediate pressure guide vanes and this would cause the rotational energy of the turbine to be absorbed in friction and plastic work, restraining the overspeed of the turbine. Also the aerodynamic damage to the turbine blades reduces the torque applied by them.

Figure 2:
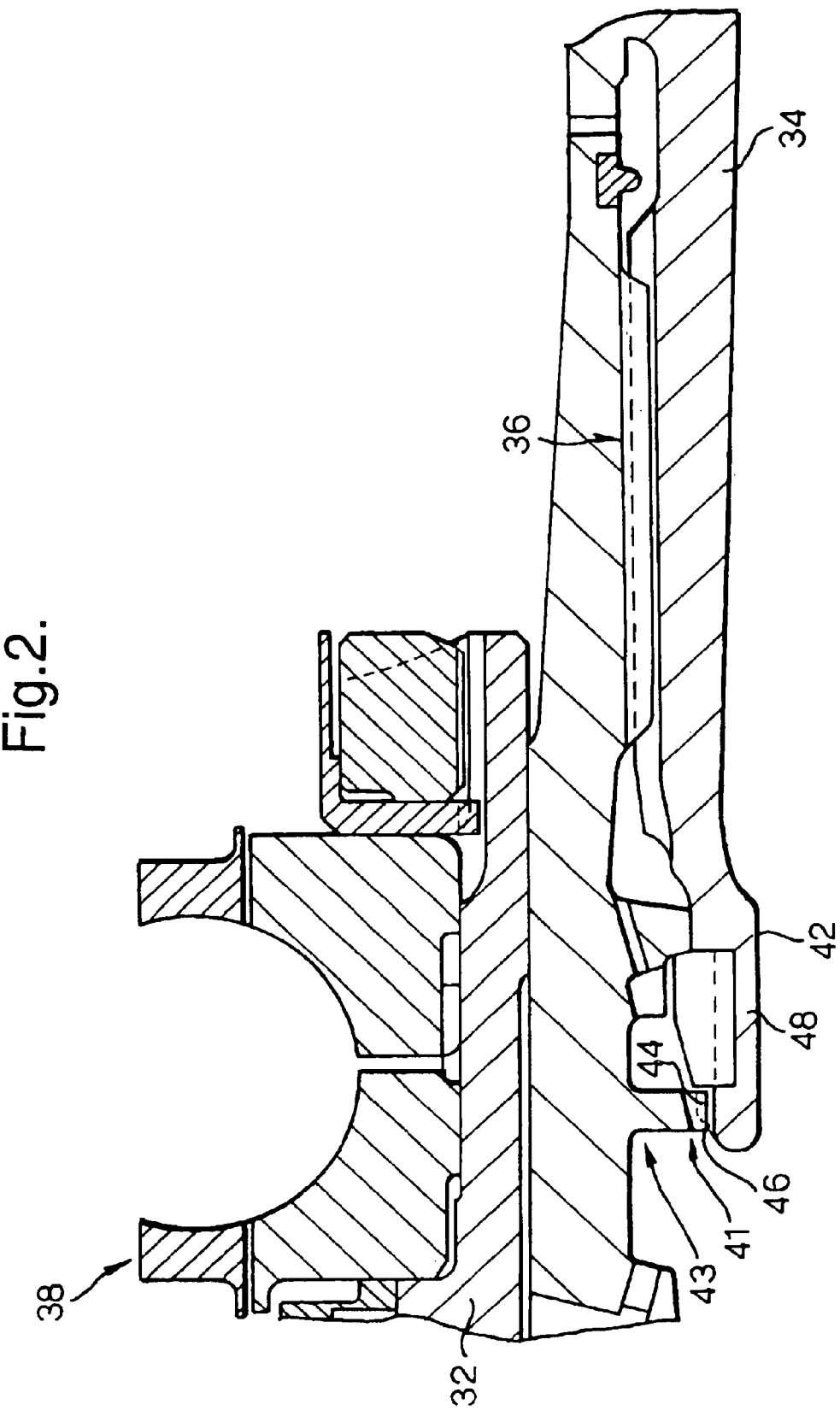
FIG. 2 is an enlarged cross-sectional part view of a ducted gas turbine engine incorporating the invention.

FIG. 2 illustrates in detail parts of a gas turbine engine according to the invention. There is shown a downstream end of the compressor shaft 32 and an upstream end of the turbine shaft 34, coupled together by the splined connection 36. In normal operation, the turbine shaft 34 drives the compressor shaft 32 via the splined connection 36.

A second torque transmission means in the form of a splined connection 41 is provided between the turbine shaft 34 and compressor shaft 32. An annular upstream end portion 42 of the turbine shaft 34 is provided with radially inwardly directed grooves 44. A stub shaft portion 43 of the compressor shaft 32 is provided with inwardly directed splines 46. The splines 46 fit into the grooves 44, but do not normally contact the edges of the grooves and do not normally transmit any torque. If however the turbine shaft 34 and compressor shaft 32 should rotate relative to one another, this would bring the splines 46 and the grooves 44 into engagement and contact and allow the transmission of torque therebetween.

Located between the splined connection 36 and the splined connection 41 is a torsionally weak shear section 48 of the turbine shaft.

In normal operation, torque is transmitted to the compressor shaft 32 from the turbine shaft 34 via the splined connection 36. The splines and grooves 46, 44 of the splined connection 41 are not in contact with one another and no torque is transmitted therebetween. In the event of a failure of the splined connection 36, the transmission of torque through that connection is lost. This causes a relative rotation of the turbine shaft 34 and compressor shaft 32. Such rotation brings the splines 46 into contact with the edges of the grooves 44 and causes torque to be transmitted from the turbine shaft 34 to the compressor shaft 32 via the splined connection 41. The shear section 48 is designed such that it can transmit low power torque but when high power torque is transmitted, it tends to break. If the shear section 48 breaks, this allows the turbine shaft 34 to move in the downstream direction. Therefore, the turbine blades on the intermediate pressure turbine 22 are able to foul against a fixed structure and damage to the engine is minimized.

The above process may take place even before the splined connection 36 fails completely. Such failure is often due to overheating and may be preceded by a weakening of the splined connection, this weakening allowing some relative movement of the turbine and compressor shafts 34 and 32 and thus bringing the splines and grooves 46, 44 into engagement. This causes the turbine shaft 34 to drive the compressor shaft 32 via the shear section 48 and therefore causes the shear section 48 to break. This can allow the intermediate pressure turbine 22 to move downstream at a relatively early stage in the failure of the splined connection 36, resulting in less catastrophic consequences than might otherwise be the case.

If for example the engine is idling, the shear section 48 of the turbine shaft 34 may not break immediately the grooves and splines 44 and 46 come into engagement, because no significant torque is being transmitted through the splined connection 41. In this case, the intermediate pressure turbine 22 would simply drive the intermediate pressure compressor 14 via the shear section 48 and the splined connection 41 until the next powerful or reverse thrust situation occurred, at which point the shear section 48 would break.

There is thus provided a gas turbine engine rotor assembly in which failure of the splined connection 36 between the turbine and compressor shafts 34, 32 causes a minimum of damage to the engine.

Various modifications may be made to the above described embodiment without departing from the scope of the invention. For example, an alternative coupling mechanism between the intermediate pressure turbine shaft and compressor shaft 32 could be used in relation to both splined connections 36 and 41. The position of the shear section 48 could be modified although it is preferably located between the splined connections 36 and 41.

Whilst endeavouring in the foregoing specification to draw attention to those features of the invention believed to be of particular importance it should be understood that the Applicant claims protection in respect of any patentable feature or combination of features hereinbefore referred to and/or shown in the drawings whether or not particular emphasis has been placed thereon.

We claim:

1. A rotor assembly for a gas turbine engine, the rotor assembly including:
a compressor, a turbine and connection means for drivingly connecting the compressor and the turbine for rotation at a common speed, the connection means including an upstream compressor shaft and a downstream turbine shaft coupled together to allow the transmission of torque therebetween, the coupling means including first torque transmission means for transmitting torque between the turbine shaft and the compressor shaft in normal operation,
wherein the coupling means further includes second torque transmission means for transmitting torque between the turbine shaft and the compressor shaft on failure of the first connection means,
wherein the turbine shaft includes a relatively torsionally weak region and transmission of torque via the second torque transmission means causes the turbine shaft to break in the torsionally weak region under certain engine conditions.

2. A rotor assembly according to claim 1, wherein the first torque transmission means includes a splined connection, failure of the torque transmission means being caused by the splines no longer transmitting torque between the turbine shaft and the compressor shaft.

3. A rotor assembly according to claim 2, wherein the splines are substantially helical, so that the transmission of torque urges the turbine and compressor shafts towards one another in the axial direction.

4. A rotor assembly according to claim 1, wherein the second torque transmission means includes a toothed connection between the turbine shaft and the compressor shaft, the teeth on the respective shafts being spaced apart in normal operation but being brought into engagement with one another on relative movement of the turbine shaft and compressor shaft, the teeth when in engagement allowing the transmission of torque between the respective shafts via the teeth.

5. A rotor assembly according to claim 4, wherein the toothed connection comprises splines on one of the shafts and complementary grooves on the other of the shafts.

6. A rotor assembly according to claim 1, wherein the relatively torsionally weak region tends to break when it drives the compressor shaft via the second torque transmission means.

7. A rotor assembly according to claim 6, wherein the torsionally weak region is located upstream at the first torque transmission means.

8. A rotor assembly according to claim 7, wherein the torsionally weak region is located between the first and second torque transmission means.

9. A rotor assembly according to claim 6, wherein the turbine shaft is normally prevented from moving downstream by the first torque transmission means, backed up by axial location means upstream of the torsionally weak region.

10. A gas turbine engine including a rotor assembly according to claim 1.

* * * * *